(12) United States Patent
Korupolu et al.

(10) Patent No.: US 7,809,915 B2
(45) Date of Patent: Oct. 5, 2010

(54) HANDLING MULTI-RANK POOLS AND VARYING DEGREES OF CONTROL IN VOLUME ALLOCATION ON STORAGE CONTROLLERS

(75) Inventors: Madhukar R. Korupolu, Sunnyvale, CA (US); Konstantinos Magoutis, New York, NY (US); Kaladhar Voruganti, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 544 days.

(21) Appl. No.: 11/768,604

(22) Filed: Jun. 26, 2007

(65) Prior Publication Data

US 2009/0006799 A1 Jan. 1, 2009

(51) Int. Cl.
*G06F 13/00* (2006.01)
*G06F 13/28* (2006.01)
(52) U.S. Cl. .............................. 711/170; 711/E12.005
(58) Field of Classification Search ........................ None
See application file for complete search history.

(56) References Cited

U.S. PATENT DOCUMENTS

| | | | |
|---|---|---|---|
| 4,104,718 A | 8/1978 | Poublan et al. | |
| 6,810,462 B2 | 10/2004 | Matsunami et al. | |
| 6,954,768 B2 | 10/2005 | Carlson et al. | |
| 2005/0015475 A1 | 1/2005 | Fujita et al. | |
| 2005/0108292 A1 | 5/2005 | Burton et al. | |
| 2005/0262326 A1 | 11/2005 | Carlson et al. | |
| 2008/0148270 A1* | 6/2008 | Gopisetty et al. | ........... 718/104 |

OTHER PUBLICATIONS

Hsu et al., "The Automatic Improvement of Locality in Storage Systems," ACM Trans. in Compl. Syst., vol. 23, No. 4, pp. 424-473, Nov. 2005.
Mai et al., "Smart Memories: A Modular Reconfigurable Architecture," ACM 1-58113-287-5/00/06-161, 2000.
Merritt et al., "z/Os support for the IBM Total Storage Enterprise Storage Server," IBM Systems Journal, vol. 42, No. 2, 2003.

* cited by examiner

*Primary Examiner*—Kevin Verbrugge
*Assistant Examiner*—Eric S Cardwell
(74) *Attorney, Agent, or Firm*—Canady & Lortz LLP; Bradley K. Lortz

(57) ABSTRACT

Techniques are disclosed for optimizing volume allocation on storage controllers that may have varying degrees of control over directing storage on ranks of pools attached storage components. A performance-based volume allocation algorithm can optimize allocation for such various controllers in a smooth, uniform manner allowing changes from one degree of control to another without incurring costly code changes and re-architecting costs. Where control is not available a surrogate set of possible ranks where the allocation could be made is developed and employed to calculate an adjusted utilization cost. In turn, the adjusted utilization cost is used to calculate a space limit value limited by a target performance threshold.

16 Claims, 6 Drawing Sheets

HANDLING MULTI-RANK POOLS AND VARYING DEGREES OF CONTROL IN VOLUME ALLOCATION ON STORAGE CONTROLLERS

CROSS-REFERENCE TO RELATED APPLICATION

This application is related to the following U.S. patent application, which is incorporated by reference herein:

U.S. patent application Ser. No. 11/750,076, filed May 17, 2007, and entitled "SCALABLE PERFORMANCE-BASED VOLUME ALLOCATION IN LARGE STORAGE CONTROLLER COLLECTIONS", by Bamba et al.

BACKGROUND OF THE INVENTION

1. Field of the Invention

This invention relates to data storage systems. Particularly, this invention relates to data storage systems using performance-based volume allocation using storage pools under varying degrees of control.

2. Description of the Related Art

Performance based volume allocation is an important aspect of storage provisioning for workloads. Modern storage controllers have several components within, such as arrays, ranks, device adapters, host adapters, and processor complexes, each with a specific set of capacities. When introducing a workload, one of the tasks a storage administrator confronts is to decide where to allocate the necessary storage volumes for that workload to meet its performance requirements while taking into account the existing performance load measures at the various storage components.

Currently, such performance-based volume allocation is performed manually based on the knowledge of expert storage consultants. Accordingly, such performance based allocation is expensive, error-prone and sometimes yields inferior solutions for the customers depending upon the level of expertise and how many alternatives a consultant considers. Some known projects, such as Ergastulum, and Hippodrome from Hewlett-Packard labs look at how to design a cost-effective storage system given the usage requirements, but they do not address the question of where to allocate new volumes based on real-time performance measures for a given storage system. Other products may address volume allocation based mostly on available space bounds. However, they do not consider performance bottlenecks that are likely to happen in various components of a subsystem due to the allocation. This may be because such performance information from the various components was not previously available in a consolidated location until very recently. Therefore, more often than not, the conventional approach has been to overprovision the storage area network (SAN) and tolerate the resulting underutilization.

Currently, with newer storage management products making improvements at gathering real-time performance information from the various components, a foundation is being laid, upon which performance-based volume allocation may be built.

Different storage controllers have some key differences from one another (e.g., IBM ESS Shark, IBM D8000 Megamouth, EMC Symmetrix, HP ones etc). Besides their structural and performance variations, a key difference among them, with respect to volume allocation, is in the concept of "storage pool". A storage pool is a logical collection of "ranks". A rank is the basic unit of capacity in a storage system. (Each rank may comprise one or more volumes for allocation.) In some controllers, such as IBM ESS Shark, a single pool comprises a single rank so the mapping is one-to-one. On the other hand, in other controllers, such as IBM DS8000 Megamouth, a single pool can comprise multiple ranks so the mapping is one-to-many. And within the one-to-many type, there are varying degrees of control that are exposed in terms of where a new volume can be created during the course of a performance-based volume allocation. These can roughly be classified as either "full control", "no control but can infer", and "no control and cannot infer". A "full control" controller is simply defined as allowing the user to fully control which rank the new volume will go to (e.g., IBM ESS Shark). The other two categories which both allow no control require further explanation.

A controller that is inferable (without control) allows the user to only specify which pool the volume will go to, but not which rank within that pool. The controller then uses an internal allocation strategy to pick one or more of the ranks within that pool and creates the volume on those ranks. However, the internal allocation strategy and any internal state information employed are exposed to the user so the user can infer which ranks the controller will select within a given pool.

Finally, a controller that is not inferable (without control) allows the user to only specify which pool the volume will go to, but not which rank within that pool. The controller then uses an internal allocation strategy to pick one or more of the ranks within that pool and creates the volume on those ranks. However, its internal allocation strategy or some of the internal state information that the controller uses (for example a cursor) are not exposed to the user and hence the user cannot even infer which ranks the controller will pick within a given pool. It could go to any of the ranks in that pool and the user needs to account for that accordingly. (e.g., IBM DS8000 Megamouth, IBM DS6000)

The two controller types without control, and in general, differing degrees of control make the task of volume allocation decisions challenging. The challenges in volume allocation due to these differing degrees of control are four fold.

First, it can be difficult to deal with variances within a pool. The different ranks in a pool can vary significantly in terms of their current utilization levels (iops/sec, bytes/sec) based on which data they are storing and how active their workloads are. Thus, a simple averaging or aggregation of all ranks in a pool cannot capture this.

Second, there can also be space-performance mismatches within a pool. The ranks with space availability may not be the ones which have good performance availability. For example, a rank which is at 10% utilization in terms of iops/sec and bytes/sec may not have any space left but a rank which is at approximately 90% utilization in terms of iops/sec and bytes/sec may have 50 units of space left. Such imbalances are quite likely since workloads have varying activity rates and it could be that the workload on the first rank takes up a lot of space but much infrequent activity. So a naïve approach of separately aggregating all space and performance availability in a pool will not suffice to address this issue.

Third, it may be difficult to accommodate a change in the degree of control in the future. The controllers themselves are evolving through multiple software and hardware releases and it is likely that some of them may move from one degree of control to another over time. For example, for IBM Megamouth there are feature requests open to make it a "full control" or at least a "no control but can infer" mode. When such a change happens, redoing and re-architecting its VPA code will be a significant cost both in terms of new software development but also in terms of testing and transition management.

Fourth, a heterogeneous mixture of controllers in customer environments can also present difficulties. In general a customer's storage environment may have many controllers with differing levels of control. In such a scenario using entirely different algorithms or code designs for each type of control makes it hard to combine them and look at the overall solution space in a unified way. Such unification is a necessary step to enable evaluating the pool/rank combinations across all controllers simultaneously to pick the best combination.

U.S. Patent Application Publication No. 2005/0262326 A1 by Carlson et al., published on Nov. 24, 2005, discloses a method, system, and article of manufacture for borrow processing in storage pools. A plurality of physical volumes are allocated to a first storage pool. A determination is made whether the first storage pool has less than a threshold number of empty physical volumes. If the first storage pool has less than the threshold number of empty physical volumes, then at least one empty physical volume is borrowed to the first storage pool from a second storage pool.

U.S. Patent Application Publication No. 2005/0108292 A1 by Burton et al., published on May 19, 2005, discloses an apparatus for managing incremental storage that includes a storage pool management module that allocates storage volumes to a virtual volume. Also included is an incremental log corresponding to the virtual volume, which maps virtual addresses to storage addresses. The apparatus may also include a replication module that sends replicated data to the virtual volume and a policy management module that determines allocation criteria for the storage pool management module. In one embodiment, the incremental log includes a lookup table that translates read and write requests to physical addresses on storage volumes within the virtual volume. The replicated data may include incremental snapshot data corresponding to one or more primary volumes. The various embodiments of the virtual incremental storage apparatus, method, and system facilitate dynamic adjustment of the storage capacity of the virtual volume to accommodate changing amounts of storage utilization.

U.S. Patent Application Publication No. 2005/0015475 by Fujita et al., published on Jan. 20, 2005, discloses that in an environment in which storages are intensively collected, many unused areas are generated and no storage resources can be efficiently used as a storage pool. The capacity utilization (data capacity) of a storage device (volume) allocated to a computer is obtained and future capacity utilization is estimated from a change in the data capacity. Upper limit securing capacity and lower limit securing capacity showing the upper and lower limits of appropriate allocating capacity calculated from this estimated capacity utilization, and the capacity of the storage device are compared with each other. When the capacity of the storage device (old device) is greater than the upper limit securing capacity, the storage device (new device) of the lower limit securing capacity or more and the upper limit securing capacity or less is allocated from the storage pool, and the old device is collected in the storage pool.

U.S. Pat. No. 6,954,768 by Carlson et al., issued Oct. 11, 2005, discloses a method, system, and article of manufacture for pooling of storage. Volume attributes are assigned to a plurality of physical volumes. Pool attributes are assigned to a plurality of storage pools, wherein the pool attributes include policies for borrowing and returning the plurality of physical volumes to and from the plurality of storage pools. One of the plurality of physical volumes is allocated to one of the plurality of storage pools based on the volume attributes of the one of the plurality of physical volumes and the pool attributes of the one of the plurality of storage pools.

U.S. Pat. No. 6,810,462 by Matsunami et al., issued Oct. 26, 2004, discloses that a storage has NAS and SAN functions and a high degree of freedom to configure a system to reduce the management and operation cost. The storage includes a plurality of interface slots in which a plurality of interface controllers can be installed, a block I/O interface controller which has SAN functions and which can be installed in the slot, a file I/O interface controller which has NAS functions and which can be installed in the slots, a storage capacity pool including a plurality of disk devices accessible from the interface controllers, and a storage capacity pool controller to control the storage capacity pool.

Existing systems and methods do not address the problem of handling different levels of control during volume allocation, particularly in systems and methods employing performance-based volume allocation algorithms. Thus, there is a need in the art for systems and methods to accommodate varying levels of control in a storage system during volume allocation. These and other needs are met by the present invention as detailed hereafter.

SUMMARY OF THE INVENTION

Techniques are disclosed for optimizing volume allocation on storage controllers that may have varying degrees of control over directing storage on ranks of pools attached storage components. A performance-based volume allocation algorithm can optimize allocation for such various controllers in a smooth, uniform manner allowing changes from one degree of control to another without incurring costly code changes and re-architecting costs. Where control is not available a surrogate set of possible ranks where the allocation could be made is developed and employed to calculate an adjusted utilization cost. In turn, the adjusted utilization cost is used to calculate a space limit value limited by a target performance threshold.

A typical embodiment of the invention comprises a computer program embodied on a computer readable medium, including program instructions for identifying at least one pool including one or more ranks to optimize volume allocation of a storage workload into a storage system using a performance-based volume allocation (PVA) algorithm, where selection of the at least one rank within the at least one pool for allocation is not controlled by the PVA algorithm, program instructions for determining a surrogate set for each rank of the one or more ranks, where the surrogate set comprises a subset of the one or more ranks of the at least one pool, program instructions for calculating a space limit value of the at least one pool based on the surrogate set, and program instructions for utilizing the space limit value in the PVA algorithm in order to optimize the volume allocation of the storage workload into the storage system. The space limit value is an amount of space that can be assigned to the at least one pool without increasing performance utilization above a performance threshold. The surrogate set of the rank can identify possible ranks where the allocation could go if recommended to a controller for the at least one pool.

In some embodiments, the PVA algorithm can use costs (i.e., performance costs) to calculate the space limit value in order to determine the volume allocation of the storage workload into the storage system. The PVA algorithm can determine the volume allocation of the storage workload into the storage system that minimizes the costs for the volume allocation. In addition, the space limit value may be calculated from a space limit for ranks and the space limit for ranks is calculated from the costs using an adjusted utilization cost for the one or more ranks. The adjusted utilization cost may be determined by a product of a current utilization cost subtracted from an average utilization cost of the one or more ranks multiplied by a configurable parameter, the product added to a current utilization cost. The configurable parameter may be adjusted to accommodate changes to degrees of control of the at least one pool. The space limit value can be determined by a sum of the space limit for ranks of the one or more ranks.

In further embodiments, the space limit for ranks may be determined by the greater of available space in the one or more ranks and a difference between a target performance threshold and the adjusted utilization cost divided by a nominal cost of the one or more ranks, if the target performance threshold is greater than the adjusted utilization cost of the one or more ranks and 0 otherwise. The nominal cost of the one or more ranks may be a determination of a performance increase upon placement of one space unit of new workload in the one or more ranks.

Similarly, a typical method embodiment of the invention comprises the steps of identifying at least one pool including one or more ranks to optimize volume allocation of a storage workload into a storage system using a performance-based volume allocation (PVA) algorithm, where selection of the at least one rank within the at least one pool for allocation is not controlled by the PVA algorithm, determining a surrogate set for each rank of the one or more ranks, where the surrogate set comprises a subset of the one or more ranks of the at least one pool, calculating a space limit value of the at least one pool based on the surrogate set, and utilizing the space limit value in the PVA algorithm in order to optimize the volume allocation of the storage workload into the storage system. The space limit value is an amount of space that can be assigned to the at least one pool without increasing performance utilization above a performance threshold. Method embodiments of the invention may be further modified consistent with program and/or system embodiments of the invention described herein.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

Embodiments of the invention address the challenges presented by varying degrees of control in performance-based volume allocation. They can provide an approach that enables handling the varying degrees of control in a uniform way with a common underlying algorithm and with a process that can easily transition from one control level mode to another. An example of a performance-based volume allocation algorithm operable with an embodiment of the invention can be found in U.S. patent application Ser. No. 11/750,076, filed May 17, 2007, and entitled "SCALABLE PERFORMANCE-BASED VOLUME ALLOCATION IN LARGE STORAGE CONTROLLER COLLECTIONS", by Bamba et al., which is incorporated by reference herein.

Embodiments of the invention provide the first known solutions for performance-based volume allocation for controllers of the "no control but can infer" and the "no control and cannot infer" types. Furthermore, dealing with the differing degrees of control in a seamless, uniform way can overcome the challenges of accommodating a change in the degree of control in the future and support a heterogeneous mixture of controllers having differing degrees of control over underlying components in customer environments previously described. Embodiments of the invention deliver a solution that is compact and practical.

For the one-to-one pool to rank mapping case, an example algorithm operates in virtually the same manner as the FULL_CONTROL algorithm. Thus, it may be described as a generalization of that algorithm. To an extent, the solution is based on defining a surrogate set of ranks for each rank which can captures the different degrees of control in a smooth way, consistently maintaining operability with an algorithm designed for more control. The algorithm handles the intra-pool variances and space-performance imbalances by calculating space limit values, as described hereafter.

Several of the natural alternatives that one might consider, do not overcome all the four challenges in a uniform way. The uniformity of this solution allows easy change from one type of control to another without having to incur substantial code change and re-design costs each time. It further enables handling heterogeneous collections of such controllers simultaneously which is a significant value, from a business and functionality perspective.

Figure 1A:
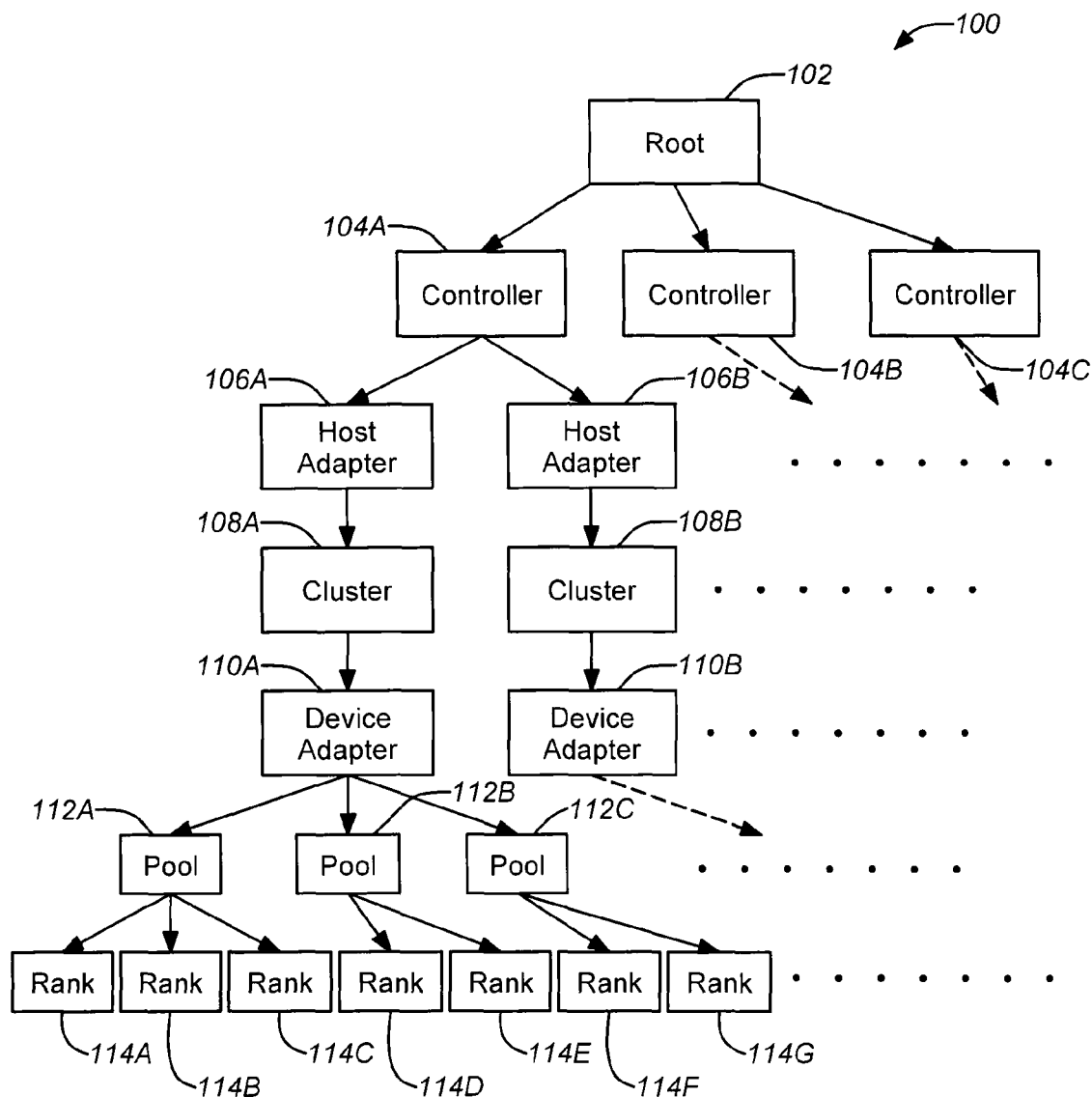
FIG. 1 illustrates a segment of a resource diagram displaying the dependencies of the hardware elements involved in a typical embodiment of the invention.

FIG. 1A illustrates an exemplary global resource graph 100, which visually represents a tree style hierarchy of the dependencies between the various interconnected hardware elements of a storage system. The node at the top of the global resource graph 100 tree structure is the root node 102, which has all of the controllers for the various storage components 104A, 104B and 104C, connected to it. The root node 102 is the central access point for all data into and out of the storage system represented by the global resource graph 100. The storage controllers 104A, 104B and 104C and the subtrees beneath each of them may be referred to as the controller resource graphs. Note that in the example only one complete branch of the global resource graph 100 is shown to the leaf nodes (ranks) at the bottom. The combination of the controller resource graphs under the common root node 102 form the global resource graph 100. In the example, the storage controller 104A is communicatively coupled to host adapters 105A and 105B, which connect the host system to the storage devices. The host adapter 105A is connected to the cluster 106A, which provides the management for the storage system. The cluster 106A is connected with the device adapter 107A, which provides communication between the cluster 106A and the storage devices 110A-110G. The storage pools 108A, 108B and 108C, identify which of the volumes, or storage devices 110A-110G that should be managed by the controllers.

It should be noted that the global resource graph 100 depicted is only an example; different storage systems will be represented by different graphs as will be understood by those skilled in the art. For example, other systems may couple controllers to different numbers of host adapters and/or device adapters may oversee different numbers of pools and rank below them, depending upon the particular storage system architecture. Completely different architectures having different component layers may also be implemented with embodiments of the invention; the global resource graph 100 is used capture generic performance characteristics of an interconnected arrangement of nodes without regard to the specific hardware or architecture as will be understood by those skilled in the art.

Figure 1B:
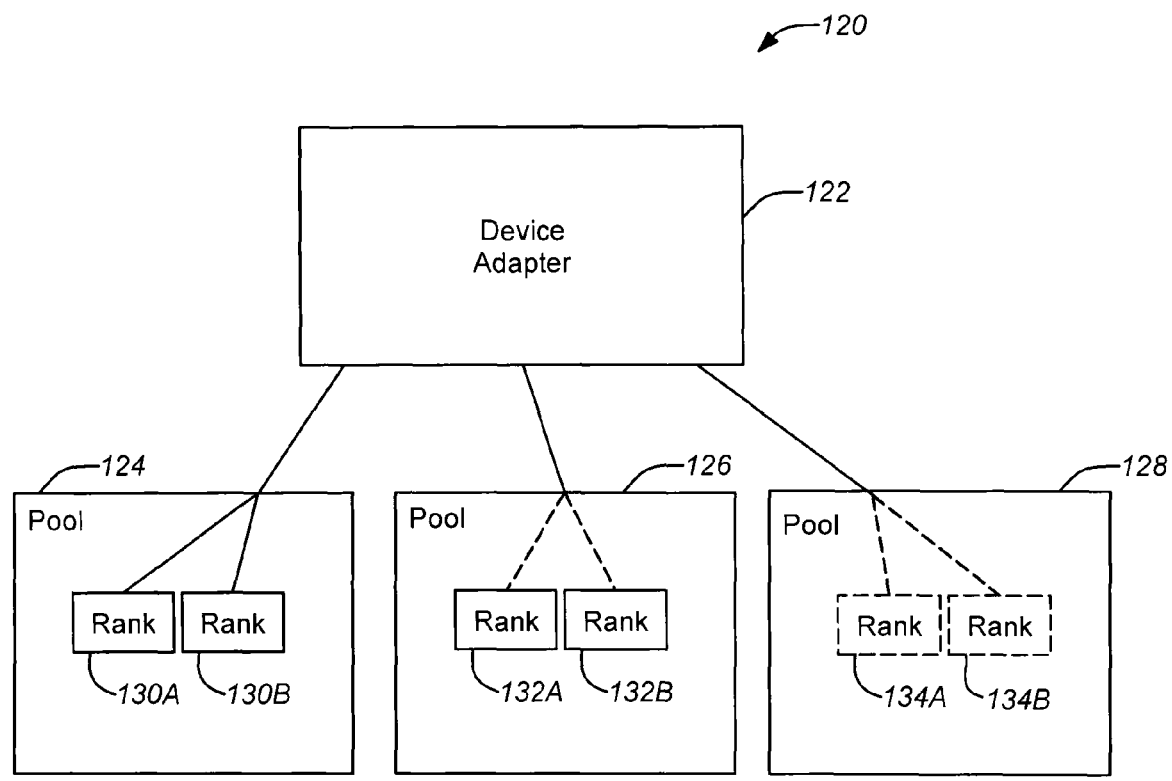

FIG. 1B illustrates a segment of a resource graph 120 of the dependencies between various interconnected hardware elements of a storage system. In this diagram, the device adapter 122 is connected to pools 124, 126, 128 of different degrees of control. The device adapter 122 connects the ranks 130A, 130B, 132A, 132B and 134A, 134B with the remainder of the storage system. Although the example shows two ranks for each pool, each pool may have any number of ranks. Typically pools within the same controller have the same type of control. However, the type of control may be different for different controllers. The example algorithm described here will operate in both cases.

The pool with FULL_CONTROL 124 shows a clear view of the ranks 130A & 130B within and a solid line connecting the device adapter to the ranks. This solid line reflects the full-control-pool's characteristic of allowing the user to have full control over which rank a particular volume is allocated to. The solid borders of the ranks 130A & 130B reflect the full-control-pool's characteristic of allowing the user to know which rank the volume is being allocated to.

The pool with NO_CONTROL_BUT_CAN_INFER 126 is shown with a broken line connecting the device adapter and the ranks 132A & 132B inside the pool 126, with the ranks 132A & 132B having solid borders. This reflects the nature of the infer-pool 126 of the user not being able to directly dictate where the volume allocation is going, but being able to infer from the internal allocation strategy which rank it is going to be placed in. The connecting line from the device adapter to the ranks 132A & 132B is not shown in the same clarity as the ranks 130A & 130B in the full-control-pool 124 in order to reflect the nature of the inability for the user to control specifically which rank the volume is allocated to.

The pool with a NO_CONTROL_AND_CANNOT_INFER type of control degree displays a broken line connecting the device adapter and the ranks 134A&B as well as a broken line border for the ranks 134A & 134B, as the user is unable to know or direct where the volume is going to be allocated within the pool. The user knows there is a rank inside the pool 128 and knows that volumes are allocated to a rank either 134A or 134B within the pool 128, but the user has no control or knowledge other than that. The user cannot dictate where the volume gets allocated, as in the full-control-pool 124 because the user has no control, and the user cannot guess which rank the volume may be allocated to, as in the infer-pool 126 because the internal allocation strategy is not revealed.

2. Hardware Environment

Figure 2A:
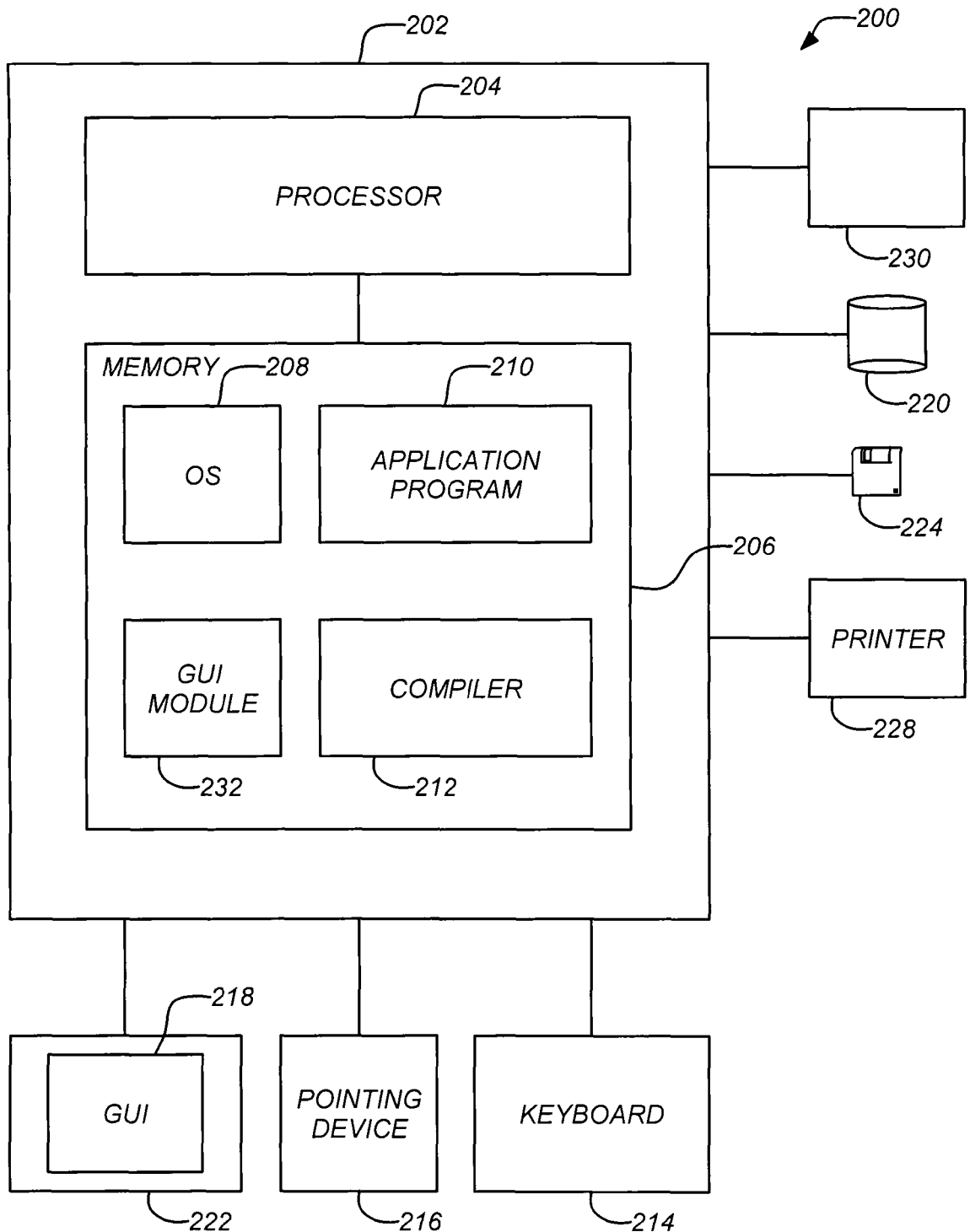
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a graphical user interface (GUI) module 232. Although the GUI module 232 is depicted as a separate module, the instructions performing the GUI functions can be resident or distributed in the operating system 208, a computer program 210, or implemented with special purpose memory and processors.

The computer 202 also implements a compiler 212 which allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Embodiments of the present invention are generally directed to a software application program 210 that manages data objects (i.e., files) access to a storage system comprised of multiple separate storage devices. The program 210 may operate within a single computer 202 or as part of a distributed computer system comprising a network of computing and storage devices. The network may encompass one or more computer/storage devices connected via a local area network and/or Internet connection (which may be public or secure, e.g. through a VPN connection).

Figure 2B:
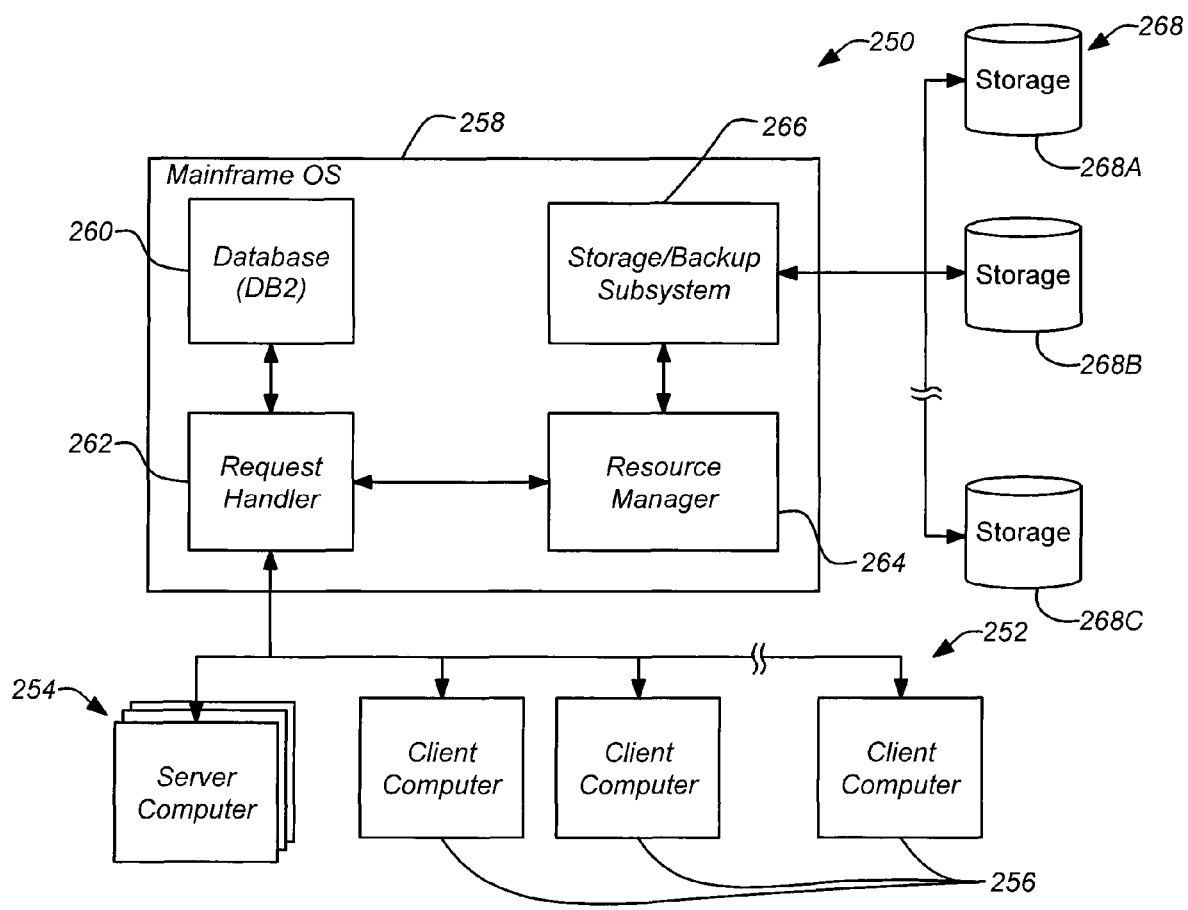
FIG. 2B illustrates a typical distributed computer system which may be employed in an typical embodiment of the invention.

FIG. 2B illustrates a typical distributed computer system 250 which may be employed with a typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 which directs data accesses through storage/backup subsystem 266 that facilitates accesses to networked storage devices 268 comprising a SAN. Thus, the storage/backup subsystem 266 on the computer 258 comprises the backup server which manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

Figure 2C:
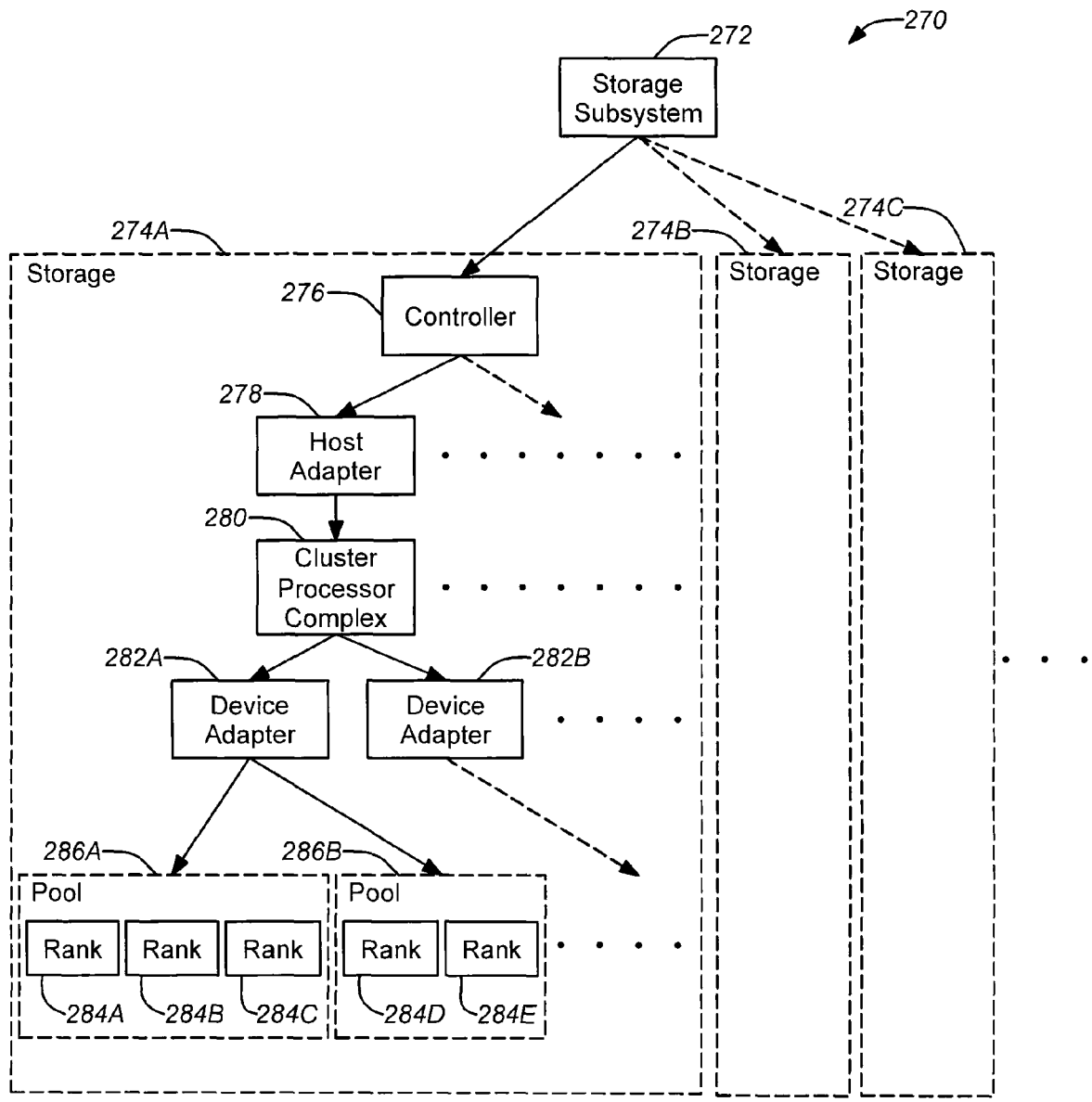
FIG. 2C illustrates a typical storage system implementing an embodiment of the invention.

FIG. 2C illustrates a typical storage system 270 implementing an embodiment of the invention. For example, the storage system 270 may operate as part of the storage/backup subsystem 266 and storage devices 268 in the distributed computer system 250 of FIG. 2B. A typical implementation of the invention comprises a program operating on the storage subsystem 272 (e.g., the storage/backup subsystem 266 of the computer 258 of FIG. 2B). The storage subsystem 272 is coupled to a plurality of storage devices 274A-274C. Although only one storage device 247A will be described in detail, it should be understood that other storage devices 274B, 274C may be similarly constituted. The controller 276 directs where data goes within the storage device 274A. The data is at least part of a storage workload coming through the storage subsystem 272. Typically, one or more host adapters 278 operate as the external interface to the system coupled to the cluster processor complex 280, which handles inputs and outputs coming from the one or more host adapters 278. The cluster processor complex 280 is connected to device adapters 282A and 282B, which connect the ranks 284A-E to the system that controls them. The ranks 284A-284E comprise the physical disks where the data is physically stored in the storage device 274A and which are accessed through one or more device adapters 282A, 282B coupled to the cluster processor complex 280. The ranks 284A-284E may be organized into one or more pools 286A, 286B under a given device adapter 282A. The described hardware architecture is only an example; those skilled in the art will understand that any number of different devices (e.g., controllers, host adapters, cluster processors, device adapters and physical disks comprising data volumes) may be coupled together in alternate architectures within the scope of the invention.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Inputs for Performance-Based Volume Allocation

As in the case of the FULL_CONTROL algorithm, it can be assumed that the current space and performance utilization for each rank in the controller are given. For clarity of exposition, it can be assumed that space is given as totalCapacity in Mb and FreeSpace in Mb and performance utilization is given as a percentage of the upper limit possible. The resource graph captures the physical dependencies among the components and is similar in concept to the one in the case of FULL_CONTROL mode.

For the new workload, the required space usage and also a nominal cost at each node are given. The nominal cost captures how much the performance would increase if a single space unit of the new workload was placed there. In addition, the logical grouping of ranks into pools is also given as input. This may occur under a one-to-one mapping or many-to-one mapping.

The FULL_CONTROL algorithm uses ranks as candidates and repeatedly finds the next rank where space can be allocated without having any of the components in the path from that rank to the root of the resource graph exceed a specified target performance threshold.

4. Surrogate Set Creation

The technique is based on defining for each rank R the notion of a surrogate set SurrogateSet(R), which is the set of ranks the allocation could go to if the user recommended <Pool(R),R> to the controller. In other words, the surrogate set comprises a subset of the one or more ranks in the pool.

In the FULL_CONTROL case, the controller, upon receiving a recommendation of <Pool(R), R>, would create the volume on rank R itself. So in this case, the SurrogateSet(R) would be {R} itself.

In the NO_CONTROL_BUT_CAN_INFER case, the algorithm has sufficient information to infer the rank R' that the control would choose within Pool(R). So, in this case, the SurrogateSet(R) would be the set {R'}.

In the NO_CONTROL_AND_CANNOT_INFER case, the allocation may happen on any of the ranks within Pool(R) as far as the algorithm can infer. So, in this case, SurrogateSet(R) is the set of all ranks in Pool(R), i.e. {R': R'\in Pool(R)}.

5. Adjusted Utilization Cost Calculation

For each rank R, given its current utilization cost U(R) and the surrogate set SurrogateSet(R) computed as above, an example adjusted utilization cost U'(R) may be computed, as follows:

$$U'(R)=U(R)+\alpha*\max[0, \text{average}\{U(R'):R'\in \text{SurrogateSet}(R)\}-U(R)]$$

where \alpha is a configurable parameter.

The adjusted utilization cost is the sum of the current utilization cost and the configurable parameter \alpha multiplied by the maximum of two values: 0 and the average utilization cost of each rank in the surrogate set of ranks, subtracted by the current utilization cost. If the current utilization cost is greater than the average of the utilization costs of the ranks in the surrogate set, the adjusted utilization cost ends up being the same as the current utilization cost.

In the one-to-one pool-to-rank case, the SurrogateSet(R) is the same as {R} so the max term inside evaluates to 0 and U'(R) remains same as U(R). Same is the case with the FULL_CONTROL case where, again SurrogateSet(R) is same as {R}.

6. Calculation of the Space Limit Value for Ranks

Given the adjusted utilization costs for all of the ranks in the pool, and a target performance threshold T, the amount of space that can be assigned to R without increasing the performance utilization above T, is computed in the natural way as follows:

```
if (T > U'(R)), spaceLimit(R,T) = max{FreeSpace(R),
    [T - U'(R)]/nominal_cost(R)}
else {spaceLimit(R,T) = 0}
```

In this equation, if the target performance threshold T is greater than the adjusted utilization cost of the rank, the space limit value of the rank is the maximum of two values: the FreeSpace of R and the difference between the target performance threshold and the adjusted utilization cost, divided by the nominal cost of R. If the target performance threshold T is not greater than the adjusted utilization cost of the rank, the space limit value of the rank is zero.

7. Calculation of the Space Limit Value for Pools

The space limit value for a pool P at a target threshold T is then computed as the sum of the space limit values of the ranks in it.

spaceLimit(P,T)=Sum{spaceLimit(R,T):R\in pool P}

8. Cost Calculation

Given these space limit values and those at the other nodes in the resource graph, the algorithm iterates through the target values from low to high, repeatedly picking candidate pools for allocation as it did in the FULL_CONTROL case (with ranks). If it is the NO_CONTROL cases then these pools are returned as the advice directly. If in the FULL_CONTROL case, a second phase allocation step is used to select specific ranks within the pool in decreasing order of space limit values.

In the one-to-one pool-to-rank mapping case, the adjusted cost U'(R) will remain the same as U(R) and furthermore spaceLimit(P,T) is same as spaceLimit(R,T). Hence the algorithm would do exactly the same as the FULL_CONTROL one and will return the same ranks and associated pools.

In the one-to-many pool-to-rank case, the adjusted cost of each rank will be same or different from the original cost depending on what case of control we are in. In the FULL_CONTROL case the adjusted cost is same as the original cost, whereas in the NO_CONTROL_BUT_CAN_INFER case, if R* is known to be one that will be picked from Pool(R), then all ranks in that pool get their U'(R) set to U(R*) or higher, with \alpha equal to 1. So it will cause R* to be chosen first. Actually in that case, the algorithm could ignore all but R* directly, but this handles it in a uniform way.

In the NO_CONTROL_AND_CANNOT_INFER case note that the cost of a rank doesn't decrease. In fact, the ranks that are above the average cost of the pool do not change. The ones below the average see their costs adjusted upward. If \alpha were 1, for example, their costs would get moved up to the average cost of the pool. If \alpha were 0, on the other hand, there would be no adjustment at all. The intuition is that those ranks are getting penalized for being in the company of more utilized surrogates. Thus, they become less preferred compared to ranks of the same original cost in another pool with more uniform costs.

Furthermore, since space limit values are first computed for each rank locally before adding up for the pool, the space performance imbalances are handled correctly. In the example cited earlier, the space limit value for the rank R1 which had cost 10 and freespace zero will always remain zero at all targets T. And for the rank R2, which had cost 90 and freespace of 50 units, the space limit value remains zero until T reaches 90 and only beyond 90 will it get a nonzero space limit value. Thus, the pool P itself will have a space limit value of zero until T reaches 90, and only beyond that will it get a nonzero space limit value. This addresses the second challenge mentioned earlier, regarding space-performance mismatches within a pool.

Since ranks in pools with higher variances get their costs adjusted upward they get a lower space limit value than they otherwise would have. Therefore, they get penalized for the variance within their pool. This handles the first challenge of variances within a pool.

The SurrogateSet(R) captures the different types of control available, and everything else beyond that is done in a uniform way. Thus, heterogeneous collections of controllers can be handled simultaneously. Each one's surrogate sets are computed accordingly and then on rest can be handled together. Similarly, when the control type for a controller changes in the future, the algorithm simply needs a change to the corresponding configuration parameter and rest will flow without any costly code changes. Thus, the difficulties arising from potential degree of control changes in the future and a heterogeneous mixture of controllers in customer environments are addressed.

Figure 3:
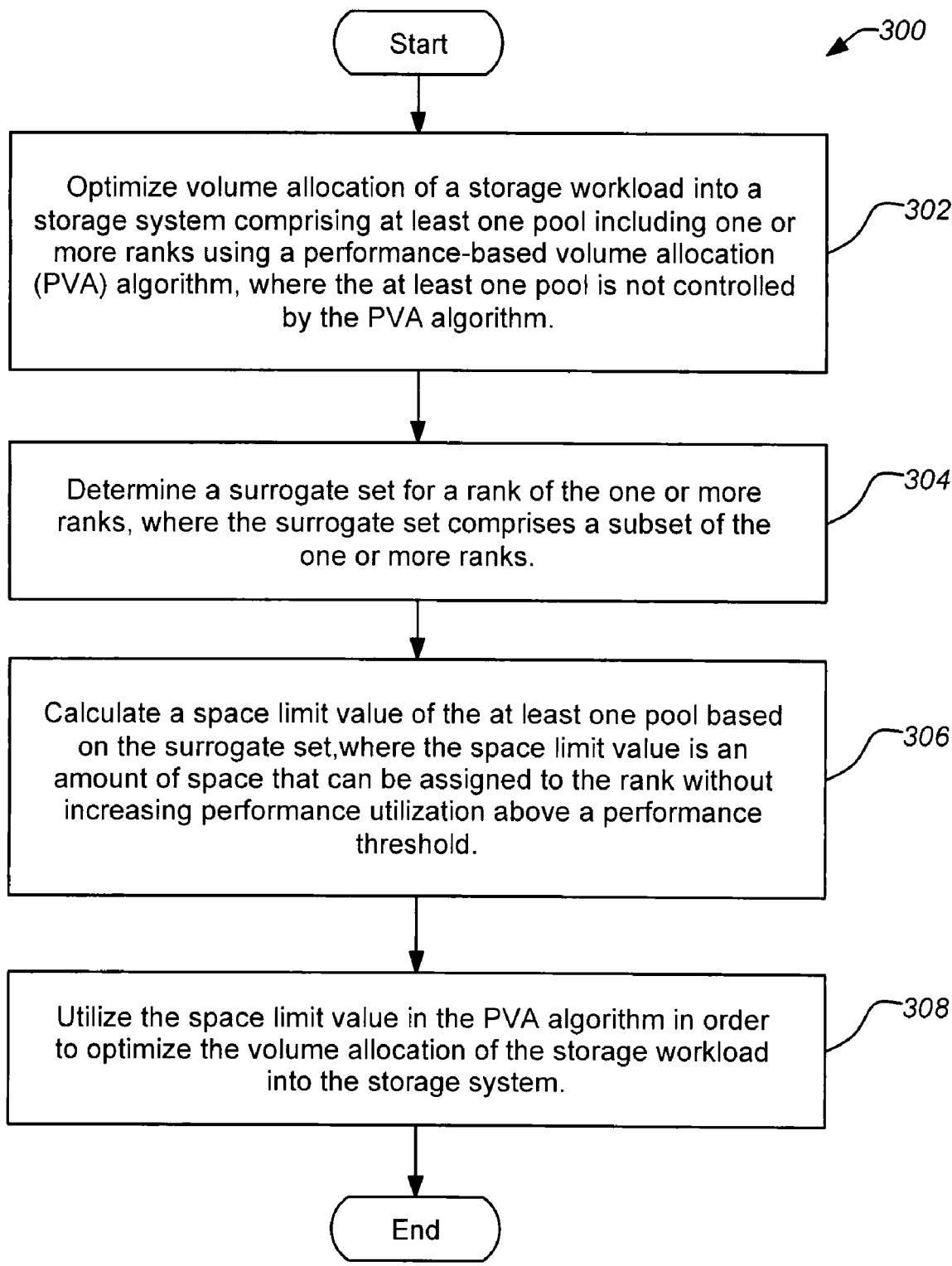
FIG. 3 is a flowchart of an exemplary method of handling varying degrees of control in volume allocation.

FIG. 3 is a flowchart of an exemplary method 300 for handling varying degrees of control in volume allocation for an embodiment of the invention. The method 300 begins with an operation 302 of identifying at least one pool including one or more ranks to optimize volume allocation of a storage workload into a storage system using a performance-based volume allocation (PVA) algorithm, where selection of the at least one rank within the at least one pool for allocation is not controlled by the PVA algorithm. In operation 304, a surrogate set for each rank of the one or more ranks is determined where the surrogate set comprises a subset of the one or more ranks of the at least one pool. Next in operation 306, a space limit value of the at least one pool is calculated based on the surrogate set, where the space limit value is an amount of space that can be assigned to the at least one pool without increasing performance utilization above a performance threshold. Finally, in operation 308, the space limit value in the PVA algorithm is utilized in order to optimize the volume allocation of the storage workload into the storage system. The method 300 may be further modified consistent with the program and systems described herein.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer readable medium, comprising:

program instructions for identifying at least one pool including one or more ranks to optimize volume allocation of a storage workload into a storage system using a performance-based volume allocation (PVA) algorithm, where selection of the at least one rank within the at least one pool for allocation is not controlled by the PVA algorithm;

program instructions for determining a surrogate set for each rank of the one or more ranks, where the surrogate set comprises a subset of the one or more ranks of the at least one pool;

program instructions for calculating a space limit value of the at least one pool based on the surrogate set; and program instructions for utilizing the space limit value in the PVA algorithm in order to optimize the volume allocation of the storage workload into the storage system;

wherein the space limit value is an amount of space that can be assigned to the at least one pool without increasing performance utilization above a performance threshold, the PVA algorithm calculates costs to calculate the space limit value in order to determine the volume allocation of the storage workload into the storage system, and the space limit value is calculated from a space limit for ranks and the space limit for ranks is calculated from the costs using an adjusted utilization cost for the one or more ranks.

2. The computer program of claim 1, wherein the surrogate set of the rank identifies possible ranks where the allocation could go if recommended to a controller for the at least one pool.

3. The computer program of claim 1, wherein the PVA algorithm determines the volume allocation of the storage workload into the storage system that minimizes the costs for the volume allocation.

4. The computer program of claim 1, wherein the adjusted utilization cost is determined by a product of a current utilization cost subtracted from an average utilization cost of the one or more ranks multiplied by a configurable parameter, the product added to a current utilization cost.

5. The computer program of claim 4, wherein the configurable parameter is adjusted to accommodate changes to degrees of control of the at least one pool.

6. The computer program of claim 1, wherein the space limit for ranks is determined by the greater of available space in the one or more ranks and a difference between a target performance threshold and the adjusted utilization cost divided by a nominal cost of the one or more ranks, if the target performance threshold is greater than the adjusted utilization cost of the one or more ranks and 0 otherwise.

7. The computer program of claim 6, wherein the nominal cost of the one or more ranks is a determination of a performance increase upon placement of one space unit of new workload in the one or more ranks.

8. The computer program of claim 1, wherein the space limit value is determined by a sum of the space limit for ranks of the one or more ranks.

9. A method, comprising the steps of:
identifying at least one pool including one or more ranks to optimize volume allocation of a storage workload into a storage system using a performance-based volume allocation (PVA) algorithm, where selection of the at least one rank within the at least one pool for allocation is not controlled by the PVA algorithm;
determining a surrogate set for each rank of the one or more ranks, where the surrogate set comprises a subset of the one or more ranks of the at least one pool;
calculating a space limit value of the at least one pool based on the surrogate set; and
utilizing the space limit value in the PVA algorithm in order to optimize the volume allocation of the storage workload into the storage system;
wherein the space limit value is an amount of space that can be assigned to the at least one pool without increasing performance utilization above a performance threshold, the PVA algorithm calculates costs to calculate the space limit value in order to determine the volume allocation of the storage workload into the storage system, and the space limit value is calculated from a space limit for ranks and the space limit for ranks is calculated from the costs using an adjusted utilization cost for the one or more ranks.

10. The method of claim 9, wherein the surrogate set of the rank identifies possible ranks where the allocation could go if recommended to a controller for the at least one pool.

11. The method of claim 9, wherein the PVA algorithm determines the volume allocation of the storage workload into the storage system that minimizes the costs for the volume allocation.

12. The method of claim 9, wherein the adjusted utilization cost is determined by a product of a current utilization cost subtracted from an average utilization cost of the one or more ranks multiplied by a configurable parameter, the product added to a current utilization cost.

13. The method of claim 12, wherein the configurable parameter is adjusted to accommodate changes to degrees of control of the at least one pool.

14. The method of claim 9, wherein the space limit for ranks is determined by the greater of available space in the one or more ranks and a difference between a target performance threshold and the adjusted utilization cost divided by a nominal cost of the one or more ranks, if the target performance threshold is greater than the adjusted utilization cost of the one or more ranks and 0 otherwise.

15. The method of claim 14, wherein the nominal cost of the one or more ranks is a determination of a performance increase upon placement of one space unit of new workload in the one or more ranks.

16. The method of claim 9, wherein the space limit value is determined by a sum of the space limit for ranks of the one or more ranks.

* * * * *